United States Patent
Kim et al.

(10) Patent No.: US 11,156,892 B2
(45) Date of Patent: Oct. 26, 2021

(54) ELECTROCHROMIC DEVICE COMPRISING HYBRID ELECTROLYTE LAYER AND METHOD FOR FABRICATING THE SAME

(71) Applicant: ORION NES CO., LTD, Gumi-si (KR)

(72) Inventors: Jung-Pil Kim, Daegu (KR); Hae-Sung Jang, Paju-si (KR)

(*) Notice: Subject to any disclaimer, the term of this patent is extended or adjusted under 35 U.S.C. 154(b) by 77 days.

(21) Appl. No.: 16/177,743

(22) Filed: Nov. 1, 2018

(65) Prior Publication Data
US 2020/0142272 A1    May 7, 2020

(51) Int. Cl.
*G02F 1/155* (2006.01)
*G02F 1/161* (2006.01)
*C09K 9/00* (2006.01)

(52) U.S. Cl.
CPC ............. *G02F 1/155* (2013.01); *C09K 9/00* (2013.01); *G02F 1/161* (2013.01)

(58) Field of Classification Search
CPC ........ G02F 1/15; G02F 1/1524; G02F 1/1503; G02F 1/1506; G02F 1/1508; G02F 1/1514; G02F 1/1516; G02F 1/15165; G02F 1/1523; G02F 1/15245; G02F 1/1525; G02F 1/53; G02F 1/1533; G02F 1/155; G02F 2001/15145; G02F 2001/1518; G02F 2001/1502; G02F 2001/15025; G02F 2001/1536; G02F 2001/1552; G02F 2001/1555

USPC ....... 359/265, 268, 269, 270, 271, 273, 274, 359/275
See application file for complete search history.

(56) References Cited

U.S. PATENT DOCUMENTS

| | | | |
|---|---|---|---|
| 2006/0033978 A1* | 2/2006 | Morin | B32B 17/10376 359/265 |
| 2007/0139756 A1* | 6/2007 | Agrawal | G11B 20/00876 359/265 |
| 2011/0058244 A1* | 3/2011 | Kobayashi | G02F 1/1533 359/270 |

FOREIGN PATENT DOCUMENTS

KR    20060092362 A    8/2006

* cited by examiner

*Primary Examiner* — Marin Pichler

(57) ABSTRACT

An electrochromic device is provided which may efficiently supply electrons to an anode layer that donates electrons externally during initial driving of the device, thereby preventing the structural weakening of the device and improve the electrical stability and durability of the device, and to a method for fabricating the same. The electrochromic device includes a first electrode, a cathode layer, an electrolyte layer, an anode layer and a second electrode, which are sequentially deposited between opposite first and second transparent substrates. The electrolyte layer includes: a first electrolyte layer configured to provide electrolyte ions to the cathode and anode layers; and a second electrolyte layer formed between the first electrolyte layer and the anode layer to have a thinner thickness than the first electrolyte layer and having a mixture of the same electrolyte as that of the first electrolyte layer and a reducing agent.

10 Claims, 4 Drawing Sheets

ELECTROCHROMIC DEVICE COMPRISING HYBRID ELECTROLYTE LAYER AND METHOD FOR FABRICATING THE SAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to an electrochromic device and a method for fabricating the same, and more particularly to an electrochromic device which comprises: a first electrolyte layer configured to provide electrolyte ions to a cathode layer and an anode layer; and a second electrolyte layer comprising a mixture of an electrolyte and a reducing agent, and which may efficiently supply electrons to the anode layer that donates electrons externally during initial driving of the device, thereby preventing the structural weakening of the device and improve the electrical stability and durability of the device, and to a method for fabricating the same.

2. Description of Related Art Including Information Disclosed Under 37 CFR 1.97 And 37 CFR 1.98

Electrochromism is a phenomenon in which a color is reversibly changed by the direction of an electric field when a voltage is applied. Devices having this characteristic are referred to as electrochromic devices. The electrochromic device is not colored when electrons do not move, but it is colored when it is reduced by donating electrons or oxidized by losing electrons. On the contrary, the electrochromic device is colored when electrons do not move, but it is not colored when it is reduced by donating electrons or oxidized by losing electrons.

The electrochromic device has been used to adjust the light transmittance or reflectance of building window glass or an automotive mirror. Recently, as the electrochromic device has been known to change color in the visible region and to have an infrared blocking effect, it has been receiving a great deal of attention with regard to the possibility of application as an energy-saving type product.

FIG. 1 shows the structure of the electrochromic device. Referring to FIG. 1, the electrochromic device has a structure in which a first electrode 120, a cathode layer 130, an electrolyte layer 140, an anode layer 150 and a second electrode 160 are sequentially deposited between opposite first and second transparent substrates 110 and 170 spaced apart from each other at a predetermined distance. In general, the cathode layer 130 is formed of nickel oxide (NiOx) which is discolored by oxidation, and the anode layer 150 is formed of an inorganic material such as tungsten oxide (WOx), which is discolored by reduction. When external power is applied to the first electrode and the second electrode 160, electrons move while electrolyte ions such as H+, Li+ or Na$^+$ moves to the anode layer 150 and the cathode layer 130, and thus coloration or discoloration occurs.

FIG. 2 shows the movement of electrons and electrolyte ions during initial driving of the electrochromic device. Referring to FIG. 2, when power is applied to the electrochromic device, electrons move from the anode layer 150 to the cathode layer 130. This movement of electrons during initial driving of the electrochromic device occurs in a state in which electrolyte ions are present only in the electrolyte layer 140 and not present in the anode layer 150. For this reason, during initial driving of the electrochromic device, a problem arises in that the structure of the anode layer 150 becomes weak due to the rapid release of electrons from the anode layer 150, thus reducing the characteristics of the device.

PRIOR ART DOCUMENTS

Patent Documents

Patent Document 1: Korean Patent Application Publication No. 2006-0092362 (published on Aug. 23, 2006).

BRIEF SUMMARY OF THE INVENTION

The present invention has been made in order to solve the above-described problem, and it is an object of the present invention to provide an electrochromic device which can efficiently supply electrons to an anode layer in an initial device state in which an electrolyte ion is present only in the anode layer, thereby preventing the structural weakening of the device and improving the electrical stability and durability of the device, and a method for fabricating the same.

To achieve the above object, the present invention provides an electrochromic device comprising a first electrode, a cathode layer, an electrolyte layer, an anode layer and a second electrode, which are sequentially deposited between opposite first and second transparent substrates spaced apart from each other at a predetermined distance, wherein the electrolyte layer comprises: a first electrolyte layer configured to provide electrolyte ions to the cathode layer and the anode layer; and a second electrolyte layer formed between the first electrolyte layer and the anode layer so as to have a thinner thickness than the first electrolyte layer and comprising a mixture of the same electrolyte as that of the first electrolyte layer and a reducing agent.

In the present invention, the reducing agent is preferably any one of ferrocene, a ferrocene derivative, hydroquinone, and a hydroquinone derivative.

In the present invention, the reducing agent is contained in an amount of 0.03 mM to 0.08 mM based on the total content of the electrolyte forming the second electrolyte layer.

In the present invention, the second electrolyte layer is preferably formed to have a thickness equal to 0.1% to 20% of the thickness of the electrolyte layer.

In the present invention, the electrolyte is a liquid electrolyte containing a UV-curing resin.

The present invention also provides a method for fabricating an electrochromic device, comprising the steps of: sequentially depositing a first electrode, a cathode layer and a first electrolyte layer on a first transparent substrate; sequentially depositing a second electrode and an anode layer on a second transparent substrate; mixing a reducing agent with the same electrolyte as that of the first electrolyte layer to obtain a mixture, and applying the mixture to the anode layer, thereby forming a liquid second electrolyte layer; and performing interfacial bonding between the liquid second electrolyte layer deposited over the second transparent substrate and the first electrolyte layer deposited over the first transparent substrate.

In the present invention, the reducing agent is preferably mixed in an amount of 0.03 mM to 0.08 mM based on the total content of the electrolyte forming the second electrolyte layer.

In the present invention, the second electrolyte layer is preferably formed to have a thickness equal to 0.1% to 20% of the total thickness of the first and second electrolyte layers.

In the present invention, the method preferably further comprises, after the interfacial bonding between the liquid second electrolyte layer and the first electrolyte layer, a step of curing the interfacially bonded second electrolyte layer by UV light.

DETAILED DESCRIPTION OF THE INVENTION

Hereinafter, embodiments of the present invention will be described in detail with reference to the accompanying drawings. However, these embodiments may be modified into various different forms, and the scope of the present invention is not limited to these embodiments.

Figure 1:
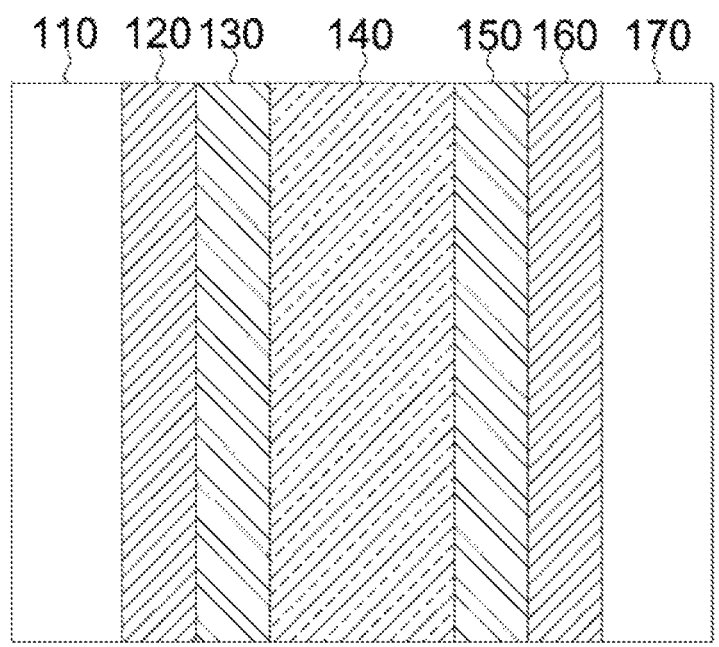
FIG. 1 shows the structure of a conventional electrochromic device.
Figure 2:
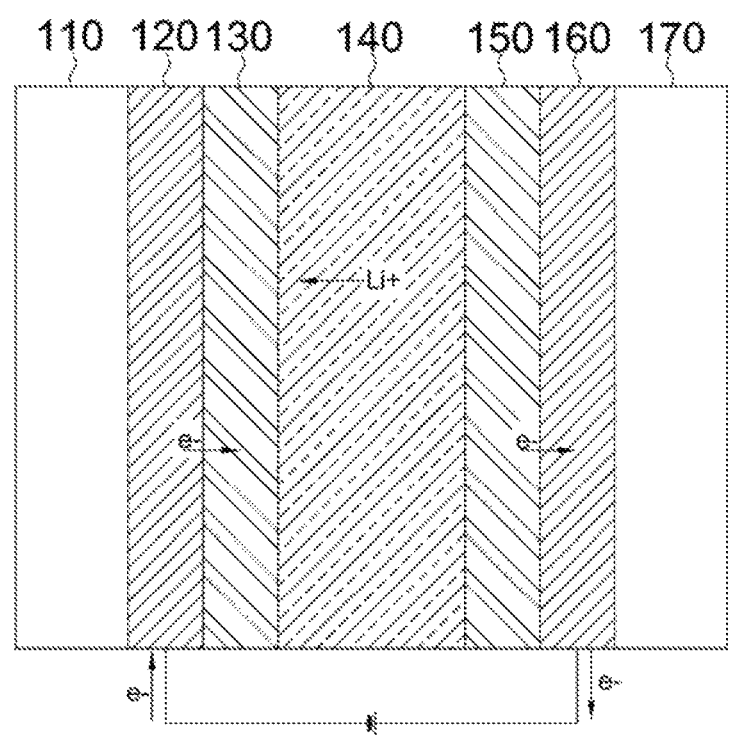
FIG. 2 shows the movement of electrons and electrolyte ions during initial driving of an electrochromic device.
Figure 3:
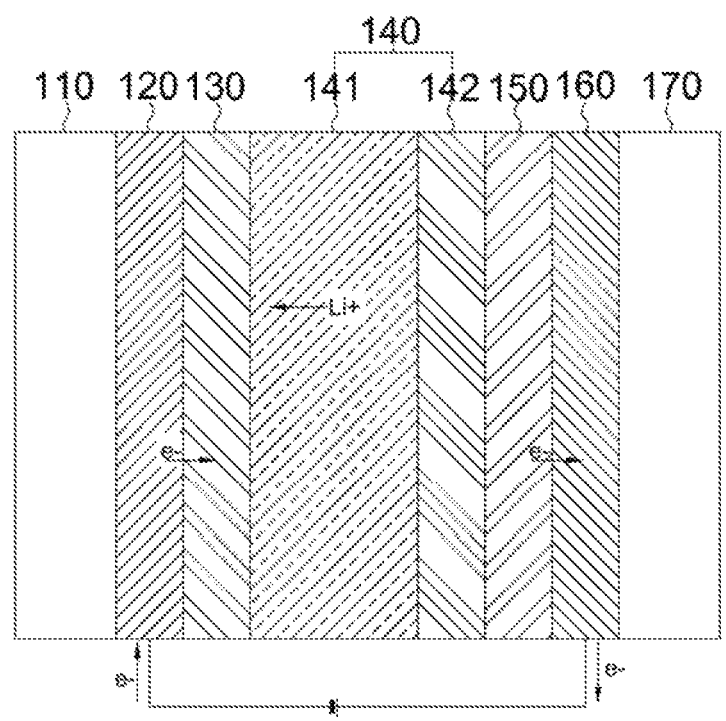
FIG. 3 shows the configuration of an electrochromic device according to the present invention.

FIG. 3 shows the configuration of the electrochromic device according to the present invention. Referring to FIG. 3, the electrochromic device according to the present invention comprises a first electrode 120, a cathode layer 130, an electrolyte layer 140, an anode layer 150 and a second electrode 160, which are sequentially deposited between opposite first and second transparent substrates 110 and 170 spaced apart from each other at a predetermined distance.

The first and second transparent substrates 110 and 170 may be glass substrates or transparent polymer substrates.

The first electrode 120 and the second electrode 160 are transparent electrodes formed on the opposite surfaces of the first transparent substrate 110 and the second transparent substrate 170, respectively, and may be formed of ITO (Indium doped Tin Oxide), ATO (Antimony doped Tin Oxide), FTO (Fluorine doped Tin Oxide), IZO (Indium doped Zinc Oxide), ZnO, or the like.

The first electrode 120 and the second electrode 160 may be thin layers formed on the transparent substrates 110 and 170, respectively, by a sputtering process. Each of the electrode 120 and the second electrode 130 may have a thickness of 150 nm or more, 200 nm or more, or 300 nm or more in the range from 1 nm to 1 µm.

The cathode layer 130 and the anode layer 150 are formed on the first electrode 120 and the second electrode 160, respectively, and are layers which are discolored by movement of the electrolyte ions. The cathode layer 130 is a layer which is discolored by oxidation, and the anode layer 150 is a layer which is discolored by reduction. The cathode layer 130 and the anode layer 150 may comprise an electrochromic material which changes color depending on an electrical signal. Specifically, the electrochromic material may be an organic or inorganic electrochromic material. The organic electrochromic material may comprise viologen, anthraquinone, polyaniline, polypyrrole or polythiophene, and the inorganic electrochromic material may comprise one or more of oxides of Ti, Nb, Mo, Ta, W, V, Cr, Mn, Fe, Co, Ni, Rh and Ir.

When the electrochromic material of each of the cathode layer 130 and the anode layer 150 is decolored, the electrochromic device may transmit incident light, and when the electrochromic material is colored, the optical characteristics of the electrochromic device may change while the transmittance of incident light may decrease. The coloring and decoloring reactions may occur alternately depending on the polarity of a voltage applied or the flow direction of current. The cathode layer 130 and the anode layer 150 preferably have a visible light transmittance of 20% to 50% when colored and a visible light transmittance of 50% to 75% when decolored.

The electrolyte layer 140 is a layer that provides an environment in which hydrogen ions or lithium ions move discoloring decoloring of the electrochromic layer. In the present invention, the electrolyte layer 140 comprises: a first electrolyte layer 141 configured to provide electrolyte ions to the cathode layer 130 and the anode layer 150; and a second electrolyte layer 142 formed to have a thinner thickness than the first electrolyte layer 141 and comprising a mixture of the same electrolyte as that of the first electrolyte layer 141 and a reducing agent. Since the first electrolyte layer 141 and the second electrolyte layer 142 comprise the same electrolyte, the resistance of the interface therebetween when bonded is so low that the electrolyte ions can smoothly move. Thus, the discoloration efficiency is not reduced. A method for interfacial bonding between the first electrolyte layer 141 and the second electrolyte layer 142 will be described later.

The electrolyte that is used in the first electrolyte layer 141 and the second electrolyte layer 142 may be a liquid polymer electrolyte comprising a UV-curing resin that can be cured by UV irradiation. The UV-curing resin may comprise a mixture of a PEG-based oligomer, a low-molecular-weight PEGDMe and a photoinitiator, and an electrolyte salt is added thereto, thereby forming an electrolyte. The electrolyte salt that is used in the present invention may be a compound containing $H^+$, $Li^+$, $Na^+$, $K^+$, $Rb^+$ or $Cs^+$. As one example, a lithium salt compound, such as $LiClO_4$, $LiBF_4$, $LiAsF_6$ or $LiPF_6$, may be used as the electrolyte salt.

According to the present invention, the second electrolyte layer 142 comprises a mixture of the above-described electrolyte and a reducing agent. The reducing agent may be any one of ferrocene, ferrocene derivatives, such as methylferrocene, dimethylferrocene, acetylferrocene, ethylferrocene, vinylferrocene, diphenylferrocene, methoxy-methylferrocene, butylferrocene, t-butylferrocene, and chloromethyl ferrocene, hydroquinone, and hydroquinone derivatives, such as methylhydroquinone, methoxyhydroquinone, acethylhydroquinone, dimethylhydroquinone, trimethylhydroquinone, ethylhydroquinone, butylhydroquinone, and t-butylhydroquinone.

As shown in FIG. 3, as the second electrolyte layer 142 comprising the reducing agent is formed on the anode layer 150, electrons may be supplied from the reducing agent of the second electrolyte layer 142 to the anode layer 150 during initial deriving of the device. For smooth electron supply and transport, the reducing agent is preferably contained in an amount of 0.03 mM to 0.08 mM based on the total content of the electrolyte forming the second electrolyte layer 142. Furthermore, the second electrolyte layer 142 is formed to have a thickness thinner than the first electrolyte layer 141, and preferably has a thickness equal to 0.1 to 20% of the total thickness of the electrolyte layer 140. If the thickness of the second electrolyte layer 142 is more than 20%, a problem may arise in that the degree of decoloration is reduced by the color of the reducing agent, and if the thickness of the second electrolyte layer 142 is less than 0.1%, smooth electron supply cannot be achieved because the amount of reducing agent added is small.

Hereinafter, a method for fabricating the electrochromic device according to the present invention will be described. The electrochromic device according to the present invention is fabricated by a method comprising the steps of: (S110) sequentially depositing a first electrode 120, a cathode layer 130 and a first electrolyte layer 141 on a first transparent substrate 110; (S120) sequentially depositing a second electrode 160 and an anode layer 150 on a second transparent substrate 170; (S130) mixing a reducing agent with the same electrolyte as that of the first electrolyte layer 141 to obtain a mixture, and applying the mixture to the anode layer 150, thereby forming a second electrolyte layer 142; and (S140) performing interfacial bonding between the first electrolyte layer 141 deposited over the first transparent substrate 110 and the liquid second electrolyte layer 142 deposited over the second transparent substrate 170.

A method for forming the electrodes 120 and 160 or the thin layers 130 and 150 or the electrolyte layers 141 and 142 is not particularly limited and may be performed using a known method. For example, each of the layers may be provided by any method selected from among deposition, spin coating, dip coating, screen printing, gravure coating, sol-gel coating, and slot-die coating.

Figure 4:
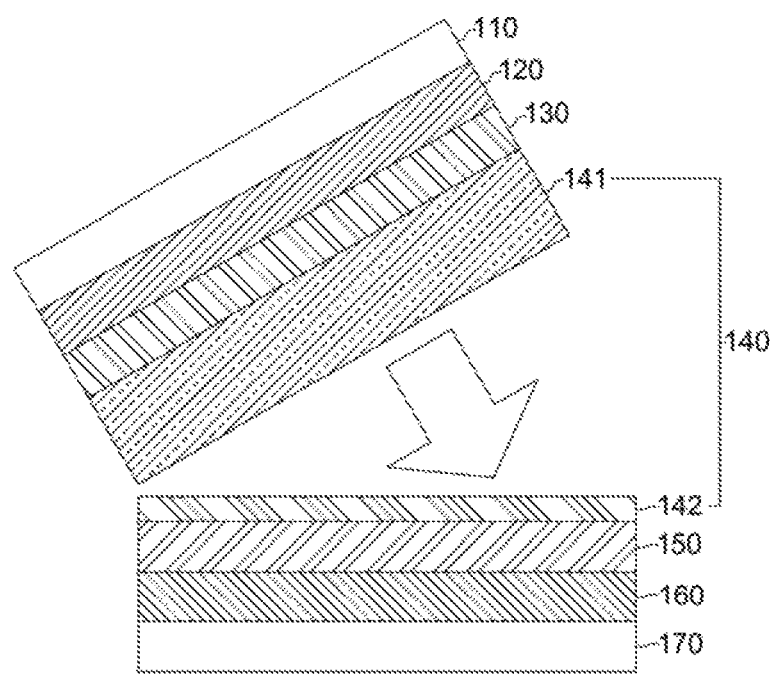
FIG. 4 shows a process of performing interfacial bonding between a first electrolyte layer and a second electrolyte layer according to the present invention.

The electrolyte layer 142 comprising the mixture of the electrolyte and the reducing agent as described above is applied to the anode layer 150 so as to have a thickness equal to 0.1 to 20% of the total thickness of the electrolyte layer 140. The electrolyte layer 142 is bonded in a liquid state for close adhesion to the first electrolyte layer 141 to be bonded thereto. Specifically, the first electrolyte layer 141 which is thicker is solidified by UV curing, and is then interfacially bonded to the liquid second electrolyte layer 142, and the interfacially bonded second electrolyte layer 142 is cured by UV light, thereby forming the electrolyte layer 140. The process for interfacial bonding between the first electrolyte layer 141 and the second electrolyte layer 142 is shown in FIG. 4. In the electrolyte layer 140 formed as described above, the first electrolyte layer 141 and the second electrolyte layer 142, which contain the same electrolyte, are closely bonded to each other, and thus the resistance of the interface therebetween is so low that the electrolyte ions can smoothly move. Thus, the discoloration efficiency of the device is not reduced. In addition, during initial driving of the device, electrons can be smoothly supplied from the reducing agent of the second electrolyte layer 142 to the anode layer 150.

Example

An ITO electrode was formed on a glass substrate, and a nickel oxide (NiOx) layer as a cathode layer 130 was formed thereon, after which a UV-curing electrolyte as a first electrolyte layer 141 was applied to the nickel oxide layer to a thickness of 0.1 mm, and then cured. Meanwhile, an ITO electrode was formed on a glass substrate, and a tungsten oxide (WOx) layer as an anode layer 150 was formed thereon. Next, 0.5 mM acetyl ferrocene was mixed with the same electrolyte of the first electrolyte layer 141, and the mixture was applied to the tungsten oxide layer to a thickness of 0.005 mm. Next, the applied mixture in a liquid state was bonded interfacially to the first electrolyte layer 141 and cured by UV light, thereby fabricating an electrochromic device. A voltage of −1.5 V to +1.5 V was applied to the fabricated device, and as a result, it was observed that the nickel oxide layer and the tungsten oxide layer were stably discolored depending on the polarity of the applied voltage and showed a light transmittance of 20%, and the light transmittance during decoloring was measured to be 65%. This suggests that the light transmittance during decoloring is excellent even when the electrolyte layer contains the reducing agent.

As described above, according to the present invention, the first electrolyte layer that provides electrolyte ions is closely bonded to the second electrolyte layer containing the same electrolyte as that of the first electrolyte layer, and thus the interfacial resistance therebetween is so low that the electrolyte ions can smoothly move. Thus, the discoloration efficiency of the device is not reduced. In addition, through the reducing agent added to the second electrolyte layer, electrons can be efficiently supplied to the anode layer that donates electrons externally during initial driving of the device. This can prevent the structural weakening of the device and improve the electrical stability and durability of the device.

Although the preferred embodiments of the present invention have been described for illustrative purposes, those skilled in the art will appreciate that various modifications, additions and substitutions are possible, without departing from the scope and spirit of the invention as disclosed in the accompanying claims.

We claim:

1. An electrochromic device comprising:
a first electrode,
a cathode layer:
an electrolyte layer;
an anode layer; and
a second electrode, wherein said first electrode, said cathode layer, said electrolyte layer, said anode layer and said second electrode are sequentially deposited between a first transparent substrate and a second transparent substrate, the first transparent substrate and the second transparent substrate being spaced from each other by a predetermined distance, said electrolyte layer comprising:
a first electrolyte layer configured to provide electrolyte ions to the cathode layer and the anode layer; and
a second electrolyte layer formed between said first electrolyte layer and said anode layer, said second electrolyte layer having a thickness less than a thickness of said first electrolyte layer, said second electrolyte layer having a mixture of the same electrolyte as said first electrolyte layer and a reducing agent, wherein the reducing agent of the second electrolyte layer has a molar concentration of 0.03 mM to 0.08 mM with respect to an entire amount of the electrolyte of said second electrolyte layer, wherein said second electrolyte layer has a thickness equal to 0.1% to 20% of a total thickness of said electrolyte layer.

2. The electrochromic device of claim 1, wherein the reducing agent is ferrocene.

3. The electrochromic device of claim 1, wherein the reducing agent is a ferrocene derivative.

4. The electrochromic device of claim 1, wherein the reducing agent is hydroquinone.

5. The electrochromic device of claim 1, wherein the reducing agent is a hydroquinone derivative.

6. The electrochromic device of claim 1, wherein the electrolyte is a liquid electrolyte containing an ultraviolet-curing resin.

7. The electrochromic device of claim 1, wherein said first electrolyte layer includes an ultraviolet-curing resin.

8. The electrochromic device of claim 7, wherein the ultraviolet-curing resin comprises a mixture of a PEG-based oligomer, a low-molecular-weight PEDMe, a photoinitator, and an electrolyte salt.

9. The electrochromic device of claim 8, wherein the electrolyte salt includes a compound containing H+, Li+, Na+, K+, Rb+ or Ca+.

10. The electrochromic device of claim 8, wherein the electrolyte salt includes a lithium salt compound including $LiClO_4$, $LiBF_4$, $LiAsF_6$, or $LiPF_6$.

\* \* \* \* \*